Patented Aug. 16, 1938

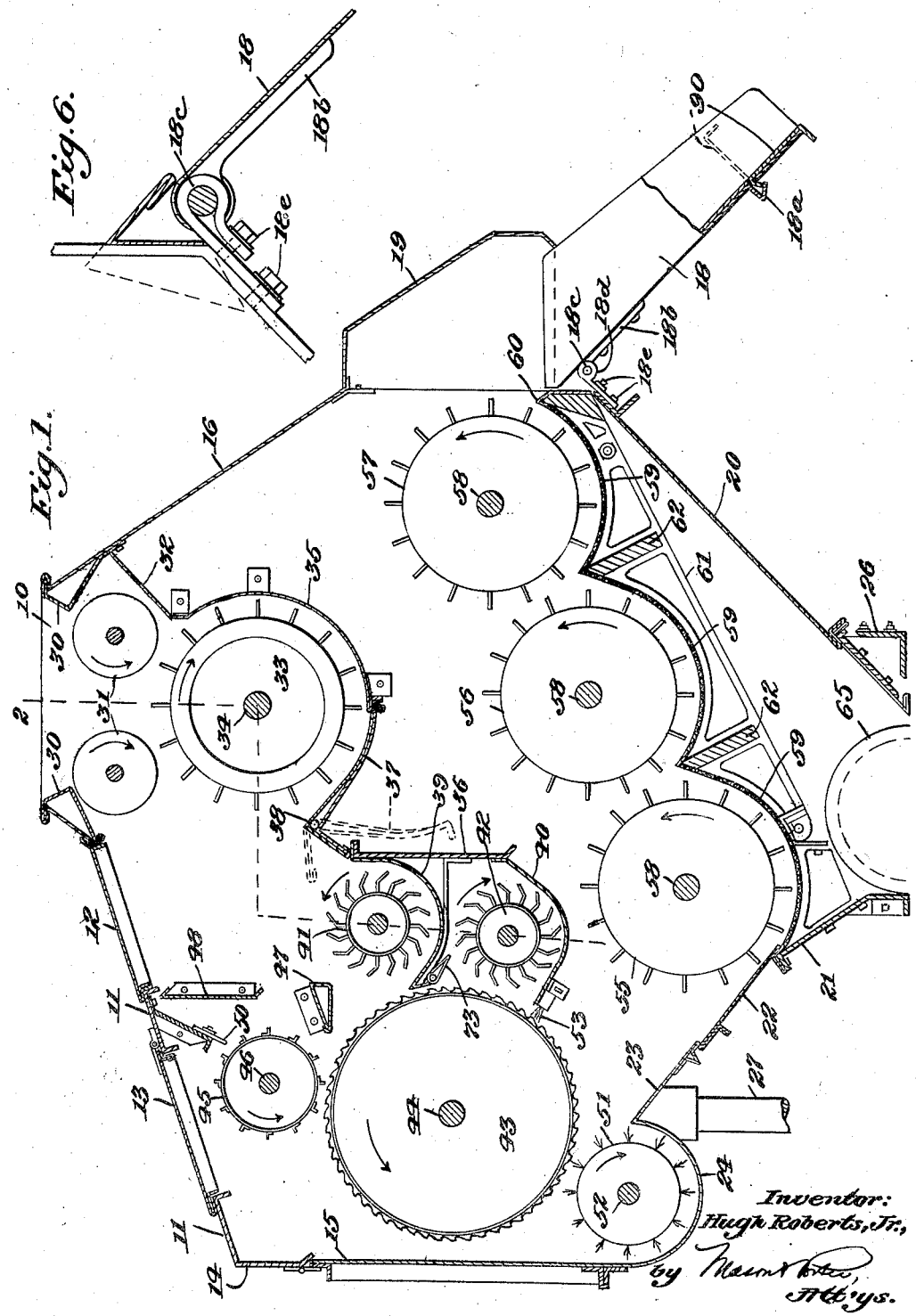

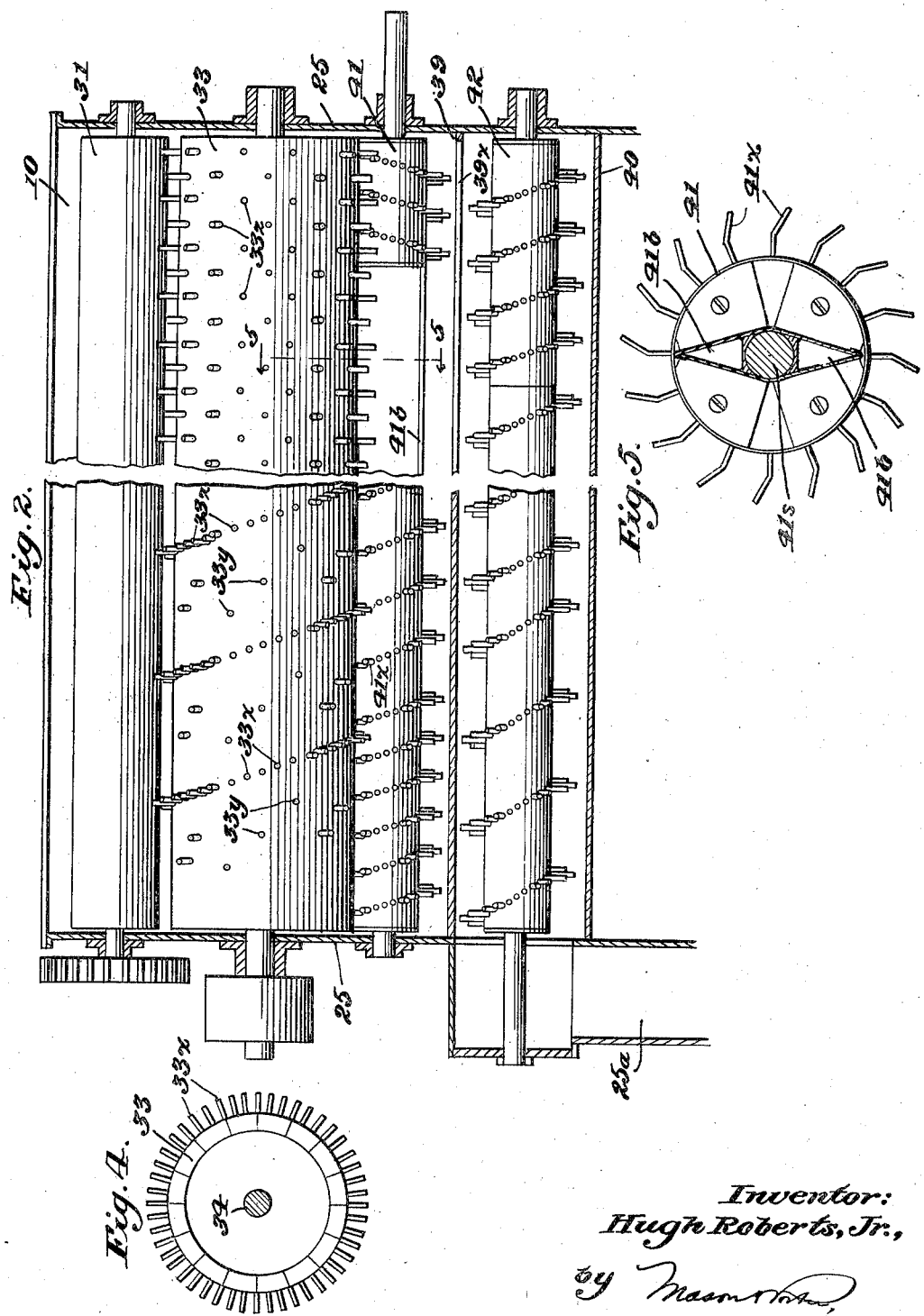

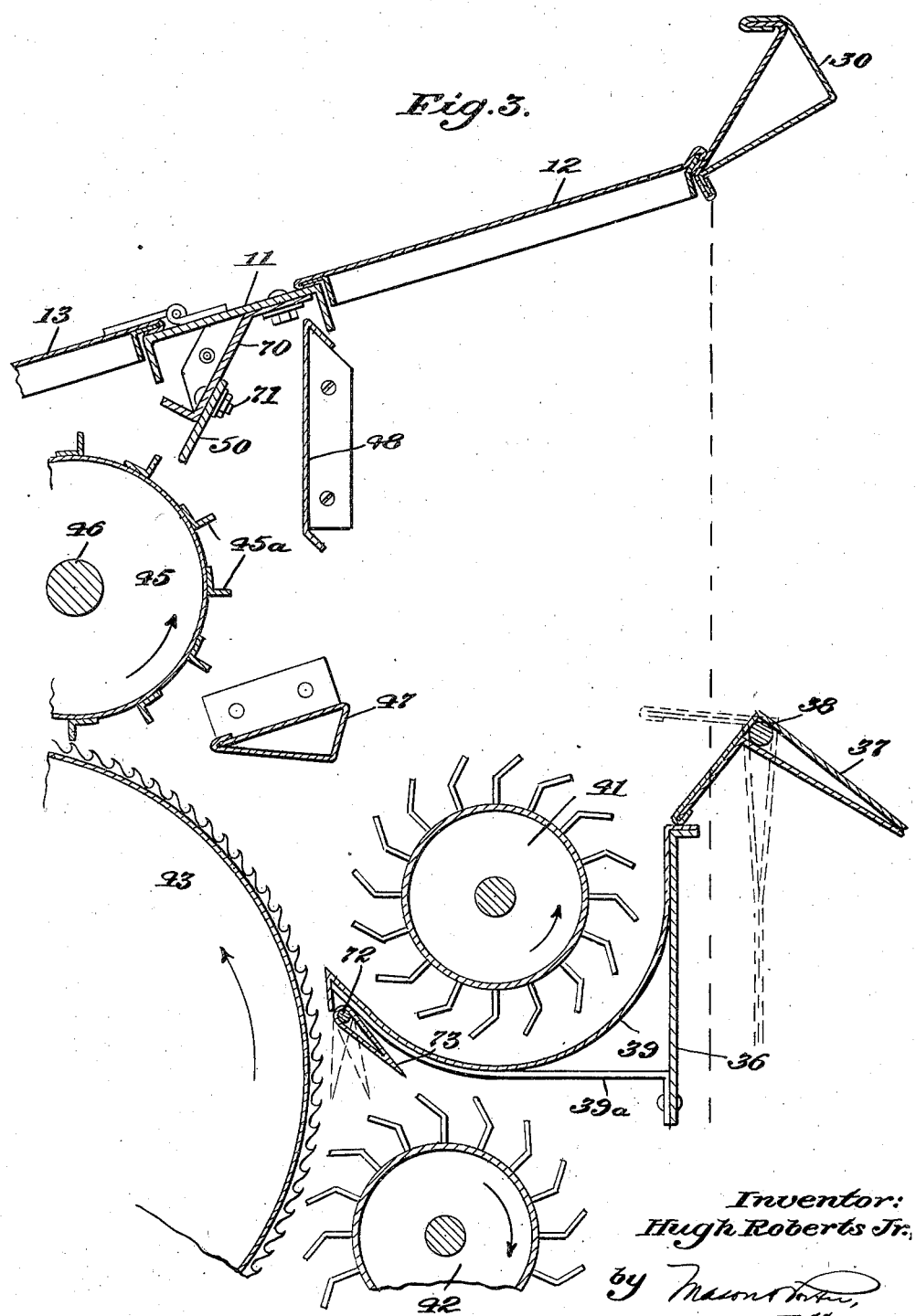

2,127,423

UNITED STATES PATENT OFFICE 2,127,423

EXTRACTOR FEEDER

Hugh Roberts, Jr., Gastonia, N. C., assignor to Cen-Tennial Cotton Gin Company, Columbus, Ga., a corporation of Georgia Application October 14, 1936, Serial No. 105,599

8 Claims. (Cl. 19—37)

This invention relates to extractor feeders which are particularly adapted for employment in cotton cleaning, ginning and baling systems.

One of the features of the present structure is the provision of means to prevent blocking or clogging of the system during the operation of extracting the cotton from association with hulls and other matter, by providing directed paths of travel for the extracted cotton and for hulls with yet-adherent and unextracted cotton.

Another feature of the present invention is the provision of novel means for controlling the presentation of hulls and cotton to a saw roller.

Another feature of the invention is the provision of baffle means for preventing the projection of cotton and hulls into portions of the paths of travel of the cotton and hulls at which such incoming new material can not be adequately handled.

A further feature of the present invention is the provision of feeding and picking rollers for maintaining a proper and adequate distribution of the cotton along the length of the machine in order to assure a substantially uniform delivery therefrom, and likewise to assure a substantially uniform operation throughout the extracting and cleaning portions of the mechanism.

Another feature of the present invention relates to a delivery structure which permits interruption of the discharge of extracted cotton when the extractor feeder is employed as a part of a cotton-handling plant, including intermittently operating means such as a baling press.

With these and other features as objects in view, an illustrative form of practicing the invention has been set out on the accompanying drawings, in which:

Figure 1 is a sectional view through an extractor feeder substantially at a right angle to the axes of the several rollers and drums.

Figure 2 is a section substantially on line 2—2 of Fig. 1, the pins or spikes being conventionalized for simplicity.

Figure 3 is a view, on a larger scale, of a portion of the structures shown in Fig. 1.

Figure 4 is an end elevation of the main picker roller.

Figure 5 is a transverse sectional view of a spiral roller substantially on line 5—5 of Fig. 2.

Figure 6 is a detail on a larger scale than Fig. 1, at the chute pivot.

A cotton-handling plant normally comprises a succession of mechanism by which the cotton is handled and treated, so that the cotton staple is recovered in a clean condition and is prepared for storage and shipment by compression into bales in a press. In certain types of such installations, the cotton is delivered at the plant in loose bulk and is taken into the plant by pneumatic suction means. This loose cotton with the adherent seeds, hulls, etc., is separated from the air current and (possibly after an initial cleaning operation to remove dirt, etc.) is delivered to a distributor which introduces it to devices for separating the cotton fiber from hulls and the like, which may be mixed therewith or adherent thereto: such devices are known as "extractor feeders". From these extractor feeders, the cotton fiber is delivered into gins which accomplish the separation of the fiber from seeds, and deliver the fiber (usually by pneumatic means and associated devices) to a baling press in which the bulk material is accumulated until a press box is filled, whereupon the flow is shut off and the accumulation compressed and bale-tied: the time required for maneuvering the press being "idle" time for the delivery of the extracted and ginned cotton thereto.

In the accompanying drawings, an extractor feeder is illustrated as comprising a casing having a top connection flange and opening 10 by which the cotton is delivered into the extractor; a rear wall structure 11 having the inspection doors 12, 13; a rear upright wall 14 having an inspection door 15; a front wall 16; a discharge chute structure 18 with a covering hood 19, the front inclined bottom wall 20, and the bottom structures 21, 22 and 23, the latter including the trough-like guard 24 surrounding the brush roller, as will be described hereinafter. These structures are combined with end walls 25 for closing the casing, and are supported by the bottom angle 26, the flanged portions of structure 21, and by a post 27.

This casing receives within it a number of shafts, partitions, and other parts. At the top, it is preferably provided with the deflector sheets 30 which guide the incoming cotton toward the centers of the first feeding rollers 31 which turn in opposite directions, moving downwardly at their adjacent faces. A partition wall 32 extends inwardly from the wall 16 toward the main picker roller 33 which is mounted on a shaft 34 appropriately journaled relative to the casing structure and turning in a clockwise direction (Fig. 1). The wall 32 joins the arcuate partition wall 35 which has a slightly greater diameter than the outer diameter of the pins on the main picker roller 33. An upright solid partition 36 extends from end to end of the casing and is spaced from the lower or front edge of the arcuate wall 35. This space may be closed by a gate 37, mounted on a pivot 38, which will be described in detail hereinafter. Extending from the upright partition wall 36 are the two troughs 39, 40 for the upper spiral picker roller 41 and the lower spiral picker roller 42. These troughs terminate adjacent the periphery of the saw roller 43 which is mounted on a shaft 44, journaled with respect to the casing and rotated in a counterclockwise direction. Above this saw roller 43 is a stripper roller 45 provided with longitudinally directed ribs and serving for stripping back hulls and like foreign matter while permitting the cotton fiber to be carried forward with the saw roller during the rotation of the latter. For this purpose, the stripper roller 45 is mounted on a shaft 46 and is rotated in a counterclockwise direction. A longitudinally extending baffle structure 47 is located above the free edge of the trough 39 and between the first spiral roller 41 and the stripper roller 45 to guide the hulls back onto the first spiral picker roller 41 and prevent the stoppage which may occur if these hulls were forced backward directly in contact with the cotton on the saw roller; and also serves to assist a partition 48, located above it, in preventing the incoming cotton from being passed directly to the stripper roller 45 from the main picker roller 33 over the top of the cotton remaining in the trough 39 and/or around the first spiral picker roller 41. A stationary blade 50 extends closely adjacent the outer diameters of the ribs of the stripper roller 45 and serves to prevent this roller from carrying hulls around with it during its revolution. It will be noted that the blade 50 and partition 48 are located beneath the top wall portion 11 which is between the doors 12 and 13, so that the door 12 permits free inspection of the cotton present in the machine above the gate 37 and in the trough 39, and between the first picker roller 33 and the stripper roller 45; while the door 13 permits inspection of the operation of the stripper roller 45 and inspection of the operation of the saw roller 43, without permitting cotton or hulls to be projected out of the machine during this inspection. The door 15 is utilized for clearing the saw roller 43 or the brush roller 51 when necessary, this brush roller being located above the guard 24, supported on a shaft 52, and rotated in a clockwise direction for stripping the cotton fiber from the saw roller 43 in the usual way.

The trough 40 of the second spiral picker roller 42 supports at its free end a brush 53 which is utilized to prevent hulls or debris from falling from the trough 40 into contact with cotton which has been extracted by the saw roller 43. It will be noted that the upper spiral picker roller 41 is preferably rotated in a counterclockwise direction, while the lower spiral picker roller 42 is rotated in a clockwise direction.

The cleaning drums 55, 56 and 57 are mounted on shafts 58 and are rotated in a counterclockwise direction for conveying the cotton fibers, as stripped from the saw roller 43 by the brush roller 51, along the cleaning screens 59; and thus delivering this cotton fiber from the ridge 60 into the chute. These screens 59 are supported by frames 61 and longitudinal members 62. The dirt which falls through the screens 59 is guided by the bottom wall 20 to the spiral conveyor screw 65, by which it is delivered to and discharged at one end of the machine.

As shown in Figs. 1 and 3, the blade 50 is secured to a longitudinal supporting member 70 by screws 71 which permit it to be adjusted toward or away from the ribs 45a of the stripper roller 45. As shown in Fig. 3, the trough 39 of the upper spiral picker roller is supported by brackets 39a. Beneath the trough 39 is provided a turnable pivot 72 on which is secured a deflector gate 73 which cooperates with the lower spiral roller 42, and may be adjusted as indicated by dotted lines in accordance with the condition of the cotton which is being cleaned and extracted. Thus, when the cotton is very hully, the gate 73 occupies the full line position, as shown in Fig. 3; with few hulls, it occupies the intermediate dotted-line position; and with clean cotton, it is adjusted to the dotted-line position in which its free edge is very close to the saw roller 43. Thus, the gate 73 operates to determine the presentation of the cotton to the saw roller by the action of the teeth on the spiral roller 42 in raising this cotton and pressing it along the surface of the saw roller 43 and toward the gate 73.

The cotton enters the extractor feeder for its entire length between the end walls 25 in the form shown. Since it is desired to discharge the cotton from the machine by chute 18 in an even stream and for the full length of the machine, while the hulls are being discharged through the chute 25a by the spiral roller 42, it is preferred to form the spiral picker rollers 41 and 42, as well as the feeder drum roller 33, of a special type of construction and arrangement. To this end, these rollers are provided as usual with pins or spikes which extend away from their surfaces for engaging and impelling the cotton fiber and hulls. The upper spiral roller 41 is illustrated as made with the pitch of a helix, in which these spikes or pins are arranged, increasing away from the left-hand end of the machine. Intermediate the length of the spiral roller 41, it has a portion which has no spikes and is of smaller diameter than the main portion of this roller, as indicated by the central shaft portion 41s in Fig. 5. A pair of metal vanes 41b are formed, as shown in Fig. 5, of metal sheets extending substantially to the diameter of the main portion of the roller 41 itself, and having flanges which are screwed against the adjacent ends of the spaced sections of this roller 41. These vanes serve for agitating the cotton over the opening 39x in the trough 39 along their length, and also allow discharge of hulls through an opening 39x in the trough 39, this opening extending from the left-hand end of these vanes 41b (Fig. 2) to a point adjacent the right-hand end wall 25. The section of the upper spiral roller 41 which is located to the right of these metal vanes is provided with a reversed spiral arrangement of the pins, which is shorter than the length of the helix or spiral of such pins provided at the left-hand end of this roller: these pins at the right-hand end of the roller are employed for assuring a proper spreading of the cotton to the saw drum or cylinder 43. The individual pins are illustrated as extending radially from the surface of the main body of the spiral roller 41 and having their outer ends bent away from the direction of rotation to assure a proper presentation and freeing of the cotton and hulls. While a gradually increasing pitch can be provided for the arrangement of these pins, it has been found possible to provide these pins in sections of several turns, with uniform spacing between the turns, this spacing increasing gradually from the left-hand end of the roller 41 as illustrated in Fig. 2.

The first picker roller 33 is illustrated in Figs.

2 and 4 as similarly having, at its left-hand end in Fig. 2, a roll of spirally arranged pins or spikes 33x, between the turns of which are preferably interspersed other spikes or pins 33y in an irregular arrangement; while the right-hand end of the picker roller 33 has a regular arrangement of the spikes or pins 33z opposite the metal vanes 41b and the right-hand pin section of the roller 41.

The bottom spiral picker roller 42 is rotated in the opposite direction from the upper spiral roller 41, and is employed for assuring the final elimination of cotton fiber from the hulls for the portion of the introduced material which is fed through the opening 39x into the trough 40, delivering this cotton fiber to the saw roller 43, and delivering the hulls and other like matter at the discharge chute 25a. For this purpose, it is likewise provided with the bent pins or spikes arranged in the spiral conformation for the same purpose of assisting the distribution of the cotton along the length of the machine and for effecting the discharge of hulls and other foreign matter. It will be noted from Fig. 2 that this roller has the spiral arrangement of its pins or spikes successively increasing from the right-hand end toward the left-hand or discharge end.

In particular, it has been found that in a machine having a saw roller 43 with 128 saws spaced one half inch apart, that excellent results were obtained in using an upper spiral picker roller 41 having a body 3½" in diameter and a length of substantially 64"; the metal vanes were made 13" long; and the right-hand section (Fig. 2) with the reversed spiral was 7½" long, with the spikes or pins spaced ½" apart on centers of a left-hand spiral of 3" pitch; adjacent its other end, the roller 41 has six turns of pins spaced ½" on centers in a right-hand spiral of 2" pitch, and contiguous a right-hand spiral of 3" pitch with the spikes also set at ½" spacings. The pins extended substantially 1¼" from the surface of the main body of roller 41, being at first radial, and then having their ends bent away from the direction of rotation so that the outer ends were offset about ⅞ of an inch from the true radial direction. The main picker roller 33 or drum had a body diameter of 10" and a length of substantially 64", the pins or spikes being spaced ¾ of an inch apart in spiral, which extends from a point 6" from the left-hand end of the drum (Fig. 2) to a point 30" from this end; while the pins 33y were interspersed irregularly between the turns of this spiral, and the pins 33z were given a staggered arrangement. The lower spiral roller 42 had a body diameter of 4", with the pins extending 1" from the periphery of this body and being bent away from the direction of rotation; from the left-hand end (Fig. 2), this roller had its spikes or pins of a right-hand spiral positioned to form four turns of 4½" pitch, then with a right-hand spiral forming eight turns of 4" pitch, and finally with a right-hand spiral of 3" pitch extending to the right-hand end of the roller.

The cotton discharge structure comprises the guard 19 which is fixed to the wall 16. The chute 18 is formed with bottom and sides. The bottom is bent downwardly and back to provide a groove structure 18a which receives the chute gate 90 (Fig. 1). When it is desired to interrupt the delivery of cotton from the machine, as when a bale has been completed at the baling press, the chute gate 90 is moved to the dotted line position, in which it obstructs the flow of cotton along the chute 18. As soon as the baling press is ready to receive further cotton, the gate 90 is raised out of the groove 18a and rocked into the position shown in Fig. 1, where it forms a discharge apron in substantial alignment with the floor of the chute 18, thus guiding the cotton on its way out of the machine. The chute 18 is provided with stiff hinge members 18b fixed to pivot rod 18c, this rod extending through the other hinge portions 18d which are secured to the wall 20 or otherwise to the casing structure by bolts 18e, which also serve to hold the hinge portions 18d in place, and also to compress parts of these structures together to hold the rod 18c against movement, and thus to determine the position of the chute 18 as desired.

The operation of the machine is as follows:

The bulk cotton is delivered into the extractor feeder through the opening 10 at its top, the uniformity and regularity of feeding being assured by the upper feed rollers 31. The first picker roller 33 takes the bulk cotton and passes it in a clockwise direction in contact with the wall 35 and the closed gate 37, and then projects it over the ridge provided adjacent the pivot 38 onto the upper spiral roller 41. It will be noted that the baffles 47 and 48 prevent the projection of this cotton directly onto the saw roller 43 or onto the stripper roller 45. The upper spiral roller 41 rotates in a counterclockwise direction and presses this incoming cotton against the periphery of the saw roller 43 which engages the fiber and moves it in a counterclockwise direction past the stripper roller 45 and to a position for engagement by the brush roller 51, which usually turns more rapidly in peripheral speed than the saw roller 43, and thus discharges the latter of the fiber, and causes the fiber to move downward for engagement by the successive cleaning drums 55, which feed the fiber along from screen to screen while permitting the discharge of dirt and like foreign matter, with a final delivery of this fiber over the ridge 60 into the chute 18, from which it drops into the gin as aforesaid, or to some other accepting structure. When the intermittent operation of the accepting structures requires a termination of this supply, the gate 90 may be moved from the full line to the dotted line position for temporarily shutting off the flow, until the baling press, for example, can be shifted for bringing an empty box into position for receiving the cotton fiber.

Any hulls which are carried from the trough 39 and upper spiral roller 41 are partly stripped back by the baffle 47, and any remaining hulls and like foreign matter are then encountered by the blades 45a of the stripper roller 45 and are thrown backward onto the upper spiral roller 41 through the space between the baffles 47 and 48, the baffle 47 operating to prevent these hulls from a compulsory travel in contact with cotton which is being moved along with the saw roller 43. The blade 50 serves to prevent hulls being carried around with the stripper roller 45 and then released so that they might drop down along the door 15 and thus pass into the cleaning system.

This operation continues as the cotton is fed into the machine and delivered by the picker rollers 33 and 41 to the saw roller 43. As the cotton fiber is withdrawn from the paths of circulation determined by the upper picker roller 41 and the stripper roller 45, the relative quantity of cotton and hulls in the trough 39 is decreasing along the length thereof, but at the same time, the spiral arrangement of pins or spikes at the ends of the roller 41 is causing the remaining cotton fiber and hulls to be moved toward an intermediate point of the length of this roller 41, comprising the vane structures 41b. The cotton fiber and hulls are here passed through the floor of the trough 39 into the lower trough 40, but the metal vanes 41b and the pins at the right-hand end of the roller 41 maintain an agitative movement of the cotton, so that the portion of the saw drum 43 opposite the same receives a normal supply, and withdraws a normal proportion of the cotton fiber.

The cotton fiber and hulls which pass into the lower trough 40 are likewise carried against the roller 43, at a point where this saw roller is free of cotton fiber, so that the teeth of the saws disengage the cotton fiber from the hulls and carry this fiber along out of the trough 40. The brush 53 operates to prevent any undesired downward discharge of the hulls from the trough 40. The gate 73 is adjusted in accordance with the relatively "hully" character of the cotton being treated, as described above. The lower spiral roller 42 has a relatively increasing pitch of its pin and roll to compensate for the increasing relative proportion of hulls toward the discharge chute 25a, and to assure a substantially uniform reception of cotton fiber by the saw roller 43 from the trough 40, as a further means of assuring a uniformity of operation and delivery from the extractor feeder.

At times, the cotton-handling plant is employed for the purpose of cleaning cotton which has already been extracted. When this is the case, it is unnecessary to pass the incoming bulk cotton fiber to the saw roller 43. In such cases, the gate 37 is moved by external means into the dotted line position of Figs. 1 and 3, in which its longer portion no longer forms a continuation of the wall 35. The cotton received through the opening 10 is then taken by the first picker roller 33 and moved along the wall 35, and then dropped directly into the cleaning system comprising the rollers 55, 56 and 57 through the opening provided by this movement of the gate 37. It will be noted, however, that any cotton which is not discharged through this opening can pass to the upper spiral roller 41 and move through the extracting system as before.

It is obvious that the invention is not limited solely to the form of construction shown, but that it may be employed in many ways within the scope of the appended claims.

I claim:

1. An extractor feeder comprising walls providing guiding means including at least one trough, said trough having an opening therein, a saw roller located adjacent the trough for extracting fiber from material in the trough, and a picker roller in the trough, said roller being sectionalized along its length, one section being opposite the opening and having metal vanes and another section having spikes or pins in a spiral arrangement.

2. An extractor feeder comprising walls providing guiding means including at least one trough, said trough having an opening, a saw roller located adjacent the trough for extracting fiber from material in the trough, and a picker roller in the trough; said roller having oppositely-pitched spirals of spikes or pins extending from its ends, and metal vanes of lesser external diameter than the overall diameter at the outer ends of the spikes or pins, said vanes being located intermediate the ends of the picker roller and opposite the opening.

3. An extractor feeder comprising walls providing guiding means including at least one trough, said trough having an opening at one end thereof, a saw roller located adjacent the trough for extracting fiber from material in the trough, and a picker roller in the trough; said roller having oppositely-pitched spirals of spikes or pins extending from its ends, one of said spirals being shorter than the other and located opposite the opening, and metal vanes of lesser external diameter than the overall diameter at the outer ends of the spikes or pins, said vanes being located intermediate the ends of the picker roller and opposite the opening.

4. An extractor feeder as in claim 3, in which the longer spiral has a successively increasing pitch from the end of the roller towards the opening.

5. An extractor feeder comprising walls providing guiding means including at least one trough, a saw roller located adjacent the trough for extracting fiber from material in the trough, said walls providing a discharge opening adjacent one end of the trough, and a picker roller in said trough; the picker roller having pins or spikes thereon arranged in a spiral of pitch which increases toward said opening.

6. An extractor feeder comprising a casing having an upper feed opening, an arcuate wall, and a first picker roller located adjacent the arcuate wall for advancing introduced material along said wall; said picker roller having pins or spikes thereon for engaging the material, one portion of length of the roller having pins or spikes in a spiral arrangement for effecting a translation of material along the length of the roller and another portion having a non-spiral arrangement thereon to prevent such translation.

7. An extractor feeder as in claim 6, in which the said one portion also has other spikes or pins interspersed between the turns of the spiral arrangement.

8. An extractor feeder comprising a casing, a main picker roller, a first trough, a second trough located below said first trough; a first picker roller in said first trough, a second picker roller in said second trough, a saw roller located adjacent the troughs and picker rollers for extracting material from the picker thereafter, said casing including internal guide walls for conveying the material to be extracted from said main picker roller into said first trough, and said first trough having a discharge means for delivering partly picked material into said second trough, and an adjustable gate located adjacent the periphery of the saw roller and pivoted immediately adjacent the edge of said first trough and extending into the path of material being moved from said second trough and said second picker roller and thereby effective for controlling the presentation of material by said second picker roller to said saw roller.

HUGH ROBERTS, Jr.